US008971618B2

(12) United States Patent
Moroney et al.

(10) Patent No.: US 8,971,618 B2
(45) Date of Patent: Mar. 3, 2015

(54) MEASURING TRANSLUCENCE

(71) Applicant: Hewlett-Packard Development Company, L.P., Houston, TX (US)

(72) Inventors: Nathan Moroney, Palo Alto, CA (US); Kok-Wei Koh, Palo Alto, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 13/740,306

(22) Filed: Jan. 14, 2013

(65) Prior Publication Data
US 2014/0198983 A1 Jul. 17, 2014

(51) Int. Cl.
*G06K 9/00* (2006.01)
*G06K 9/62* (2006.01)

(52) U.S. Cl.
CPC .................................. *G06K 9/6201* (2013.01)
USPC ......................................................... 382/165

(58) Field of Classification Search
CPC ............ G01J 3/508; G01J 3/524; G01J 3/46; G01J 3/463; A61B 5/0088; A61B 2560/0233; A61B 5/0075; A61B 5/0084; A61B 5/1034; A61B 5/4547; A61B 5/0064; A61B 5/1077; A61B 2019/444; A61B 2562/085
See application file for complete search history.

(56) References Cited

U.S. PATENT DOCUMENTS

| 2,618,197 | A | * | 11/1952 | Boushey ........................ 353/85 |
| 4,832,495 | A | | 5/1989 | Briggs et al. |
| 5,047,652 | A | | 9/1991 | Lisnyansky et al. |
| 5,899,959 | A | | 5/1999 | Shields et al. |
| 5,926,291 | A | * | 7/1999 | Haraguchi et al. ............ 358/518 |
| 6,008,905 | A | * | 12/1999 | Breton et al. ................. 356/402 |
| 6,111,653 | A | | 8/2000 | Bucknell et al. |
| 2003/0016251 | A1 | * | 1/2003 | Kondo .......................... 345/846 |
| 2003/0038938 | A1 | * | 2/2003 | Jung et al. .................... 356/419 |
| 2008/0021584 | A1 | * | 1/2008 | Whaite et al. ................. 700/109 |
| 2012/0140289 | A1 | * | 6/2012 | Lachajewski et al. ....... 358/3.01 |
| 2012/0263379 | A1 | | 10/2012 | Bhatti et al. |

FOREIGN PATENT DOCUMENTS

JP 2003-274199 * 9/2003 ............... H04N 1/60

OTHER PUBLICATIONS

Measuring Flat, Translucent Solids Using the Miniscan EZ, (Web page).
Paper Trade Journal, 40th Year—1912-13 Lockwood Trade Journal Co.

* cited by examiner

Primary Examiner — Jingge Wu
(74) Attorney, Agent, or Firm — Hewlett-Packard Patent Department; Steven L. Webb

(57) ABSTRACT

A target and a method to use the target to determine the translucence of media is disclosed. The target has a first region and a second region. The first region comprises a color chart. The second region comprises a test pattern that is covered by the sample media when the sample media is loaded onto the target. The test target has a first area and a second area. An image of the target loaded with the sample media is used to determine the translucence of the sample media. The color of the media over the first and second areas of the test target are matched to the nearest color patches in the image of the color chart. The estimated actual colors of the media over the first and second areas of the test target are determined using the known colors of the nearest color patches. The translucence is determined using the difference between the estimated actual colors of the media over the first and second areas of the test target.

14 Claims, 7 Drawing Sheets

MEASURING TRANSLUCENCE

BACKGROUND

The translucence of media is one factor in determining if the media is appropriate for a printing task. Translucence is the measure of the amount of light that can diffusely pass through media.

DETAILED DESCRIPTION

Figure 1:
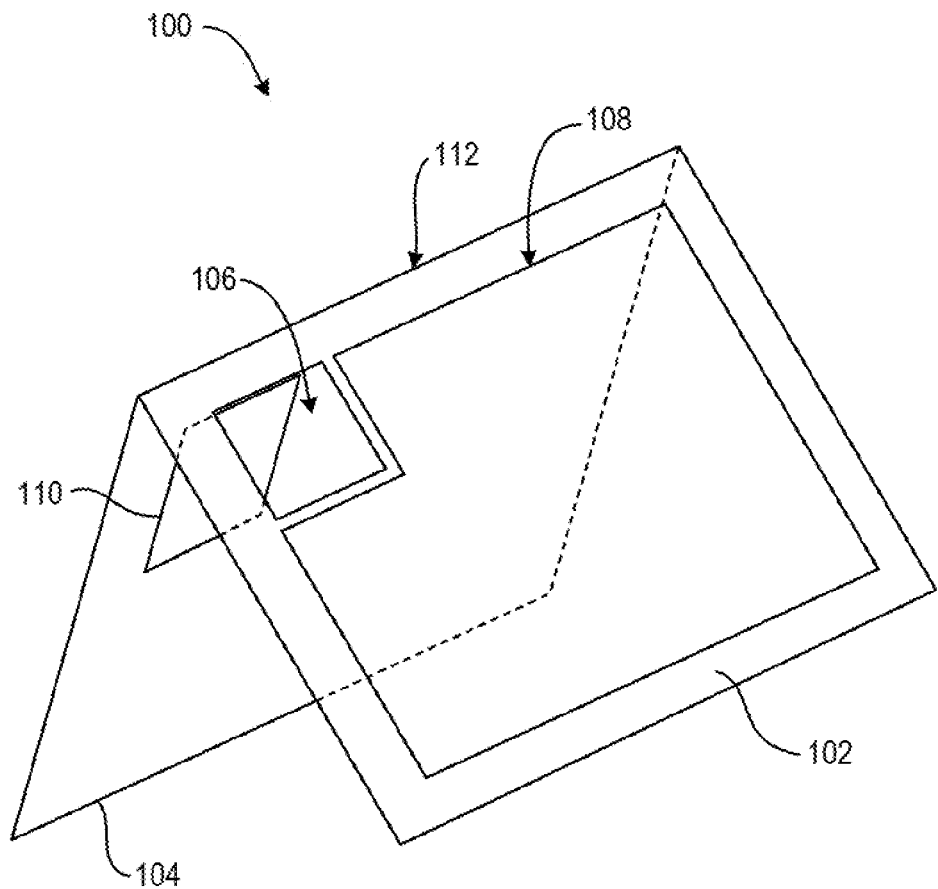
FIG. 1 is an isometric side view of an example target 100.

FIG. 1 is an isometric side view of an example target 100. Target 100 is used to determine the translucence of media. Target 100 comprises a sheet of media folded in half along a crease 112, creating a top fold 102 and a bottom fold 104. The target can be in an open position or a closed position. In the closed position the top fold 102 is positioned against the bottom fold 104. In the open position the top fold is rotated along the crease away from the bottom fold 104 to allow test media to be positioned between the two folds. The target is shown in the open position in FIG. 1.

The bottom fold 104 has an inside face that comprises a test pattern 110. In one example, the test pattern is half black and half white. Other patterns or colors may be used. The top fold has a front face comprising two regions. Region 106 is a cutout section or opening that allows the test pattern 110 on the bottom fold to be seen when the target is in the closed position. The second region 108 on the front face comprises a color chart. The color chart comprises a plurality of different color patches.

In operation, media to be tested (the sample media) is inserted between the two folds and the target is closed. A single image is captured of the front face of the top fold 102. The image of the front face will contain two regions. The first region is an image of the color chart. The second region is the sample media showing through the opening or cutout section 106. When the sample media is translucent, the test pattern 110 will show through the media and be partially visible in the second region 106 of the captured image. When the sample media is completely opaque the image of the test pattern will not show through the media and only the sample media will be visible in the second region 106.

Figure 2A:
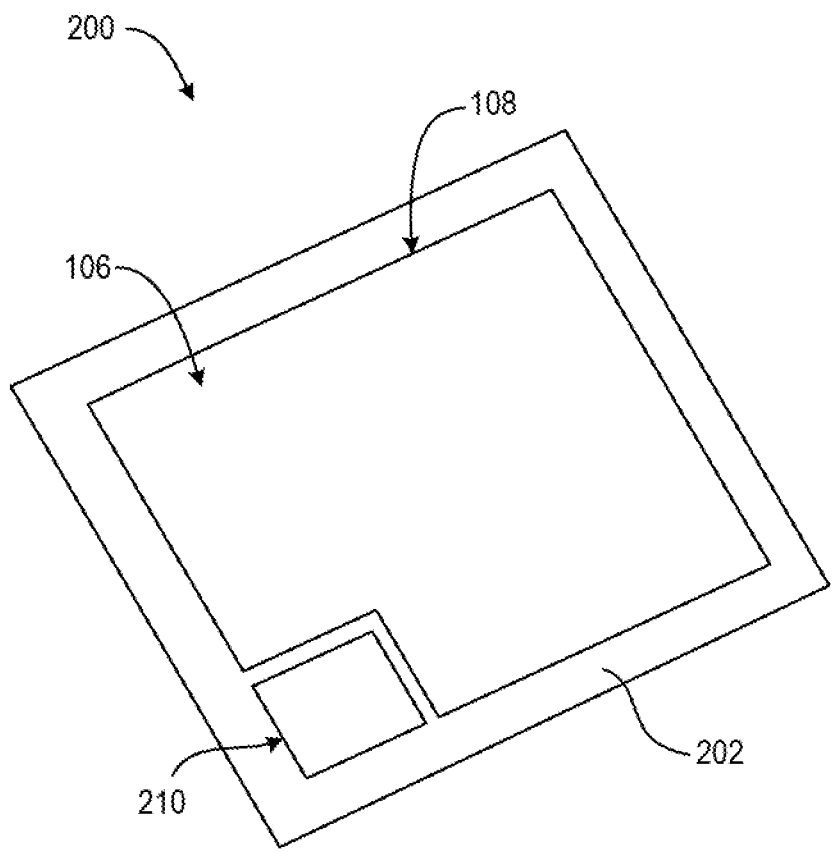
FIG. 2A is an isometric view of another example of a target 200.

FIG. 2A is an isometric view of another example of a target 200. Target 200 comprises a single flat sheet of media. The front face of target 200 has two regions. The first region 208 is a color chart. The color chart comprises a plurality of different color patches. The second region is a test pattern 210. In one example, the test pattern 210 is half black and half white. In other examples different patterns or colors may be used.

Figure 2B:
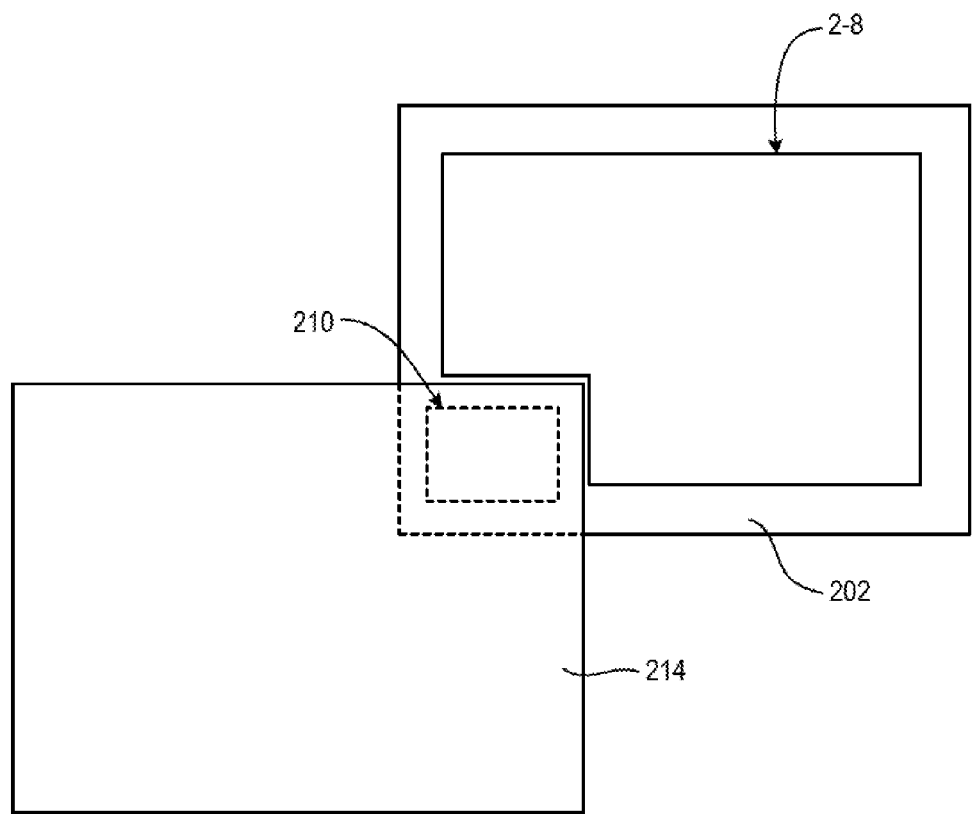
FIG. 2B shows sample media in a position to be tested on target 200.

In operation, media to be tested (the sample media) is placed over the test pattern 210. FIG. 2B shows sample media in a position to be tested on target 200. Sample media 214 is positioned on top of test region 210 but leaves region 208 uncovered. A single image is captured of the sample media positioned on target 200. The image of target 200 will contain two regions. The first region is an image of the color chart. The other region in the image is the sample media on top of test pattern 210. When the sample media is translucent, the test pattern 210 will show through the media and be partially visible in the captured image. When the sample media is completely opaque the image of the test pattern will not show through the media and the test target will not be visible through the sample media.

The images of the two regions are used to determine the translucence of the sample media. Because the two regions of the image were captured at the same time, the illumination used to capture the two regions is also the same. The illumination may be ambient light or ambient light augmented by a flash. The image of the sample media will be used to determine the colors measured through the sample media located on top of the black and white areas in the target image. When the sample media is completely opaque, the color measured on top of the white area of the test target will be the same as the color measured on top of the black area of the test target. When the sample media is not opaque, the color measured on top of the white area of the test target will be different than the color measured on top of the black area of the test target.

Because the illumination used to capture the image is ambient light and/or ambient light augmented by a flash, the measured color above the black and white patches in the test pattern 210 will typically have some tint or color even when the media is pure white. The image of the color chart will be used to determine the estimated actual color of the black and white test patterns as seen through the sampled media. The translucence is determined by using the estimated actual color of the black and white test patterns as seen through the sampled media.

Figure 3:
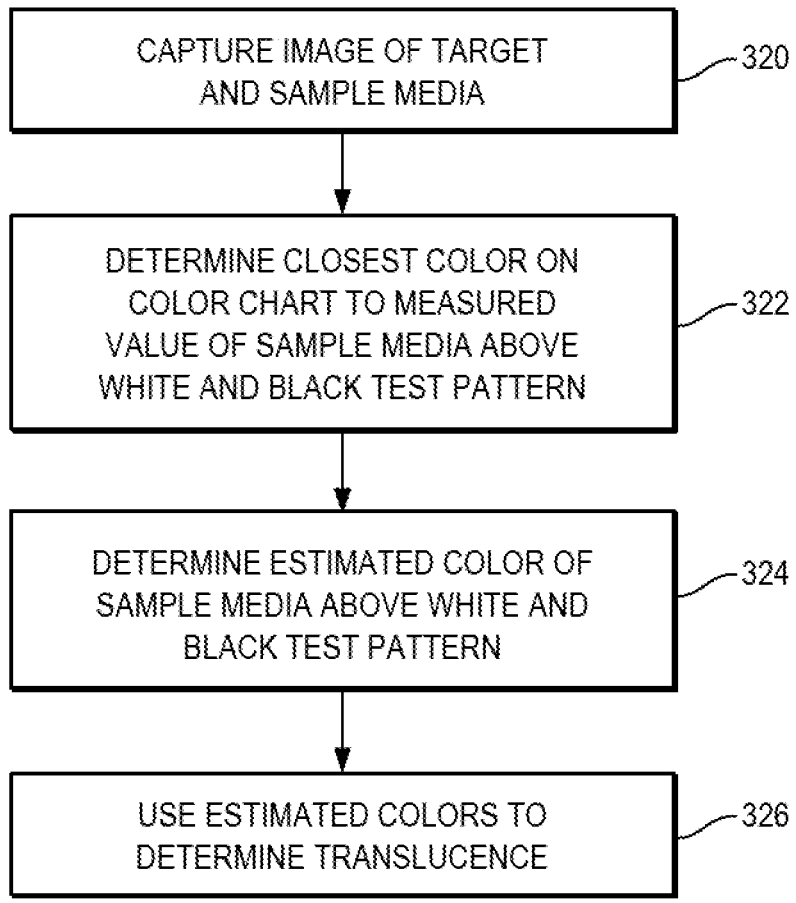
FIG. 3 is a flow chart for an example method for determining translucence of a sample media.

FIG. 3 is a flow chart for an example method for determining translucence of a sample media. At step 320 an image is captured of the sample media loaded on a target. The target has two regions where the first region is a color chart and the second region is a test pattern. In one example the test pattern has at least one black area and at least one white area. The sample media covers the test pattern when it is positioned on the target.

At step 322 the closest color patches on the image of the color chart to the measured values of the black and white areas through the sample media ($K_m$ and $W_m$) are determined. At step 324 the estimated actual colors for the black and white areas ($K_E$ and $W_E$) are determined using the known color values of the closest determined color patches on the color chart. At step 326 the estimated actual colors for the black and white areas are used to determine the translucence of the sample media. The translucence of the sample media is determined using the color difference between the estimated actual colors for the black and white areas ($K_E$ and $W_E$).

At step 320 the closest color patches on the image of the color chart to the measured values of the black and white areas through the sample media ($K_m$ and $W_m$) are determined. Because the color patches in the color chart are typically much larger than the pixels in the capture device, each color patch in the image of the color chart will have multiple pixel values in the captured image. In one example, each color patch will be assigned the median value of all the pixel values for that patch. In other examples the average or mean value of the pixel values for that patch will be used. When there are n color patches in the color chart, the mean values for each color patch will be given the notation $R_1, G_1, B_1$ for the first patch color and $R_n, G_n, B_n$ for the last patch color, assuming an RGB color space.

The median of the pixel values measured through the sample media located over the white patch will be called the measured white value ($W_m$) and will be given the notation $R_w, G_w, B_w$. The median of the pixel values measured through the sample media located over the black patch will be called the measured black value ($K_m$) and will be given the notation $R_k, G_k, B_k$. To find the closest in color patches to the measured colors $W_m$ and $K_m$ a least square fit method can be used. Alternatively, the color difference ($\Delta E$) between each color patch on the chart and $W_m$ and $K_m$ may be computed. The color difference values may be sorted to create a list of the in neighbors with the smallest $\Delta E$ values. Still further, the system may be configured to use only neighbors within a specific $\Delta E$ range. In such an example, the number of neighbors would vary for each sample depending on how many patches are within the target $\Delta E$ range.

Using, the in closest color patches the 4 points that create a bounding tetrahedron that enclose each of $W_m$ and $K_m$ are found. According to one example, the following formula may be used to test whether a measured color falls within a given tetrahedron:

$$\begin{bmatrix} \alpha \\ \beta \\ \gamma \end{bmatrix} = \begin{bmatrix} R_1 - R_0 & R_2 - R_0 & R_3 - R_0 \\ G_1 - G_0 & G_2 - G_0 & G_3 - G_0 \\ B_1 - B_0 & B_2 - B_0 & B_3 - B_0 \end{bmatrix} \cdot \begin{bmatrix} R_s - R_0 \\ G_s - G_0 \\ B_s - B_0 \end{bmatrix} \quad \text{Equation 1}$$

Where $\alpha + \beta + \gamma <= 1$ and $\alpha >= 0$, $\beta >= 0$ and $\gamma >= 0$ if the values of $W_m$ or $K_m$ fall within the given tetrahedron. Where $R_i, G_i$ and $B_i$ are the R, G and B values in color space of the bounding tetrahedron (with i=0-3) and $R_s, G_s$ and $B_s$ are the R, G and B coordinates in color space of the sample color 's' to be tested (i.e. $W_m$ and $K_m$).

Once a bounding tetrahedron is located, the estimated actual colors for the black and white areas ($K_E$ and $W_E$) are determined using the known values of the color chart, the measured values of the color chart and the measured values of the black and white areas through the sample media ($K_m$ and $W_m$). This may be computed as follows:

$$\begin{bmatrix} A_i \\ B_i \\ C_i \end{bmatrix} = \begin{bmatrix} a_1 - a_0 & a_2 - a_0 & a_3 - a_0 \\ b_1 - b_0 & b_2 - b_0 & b_3 - b_0 \\ c_1 - c_0 & c_2 - c_0 & c_3 - c_0 \end{bmatrix} \cdot \begin{bmatrix} R_1 - R_0 & R_2 - R_0 & R_3 - R_0 \\ G_1 - G_0 & G_2 - G_0 & G_3 - G_0 \\ B_1 - B_0 & B_2 - B_0 & B_3 - B_0 \end{bmatrix}^{-1} \cdot \begin{bmatrix} R_s - R_0 \\ G_s - G_0 \\ B_s - B_0 \end{bmatrix} + \begin{bmatrix} A_0 \\ B_0 \\ C_0 \end{bmatrix} \quad \text{Equation 2}$$

Where $a_0$-$a_3$, $b_0$-$b_3$ and $c_0$-$c_3$ are the known colors of the 4 corners of the bounding tetrahedron. $A_i, B_i, C_i$ are the interpolated actual values of the sample color 's' to be tested (i.e. $W_m$ and $K_m$). $R_i, G_i$ and $B_i$ are the measured R, G and B values of the bounding tetrahedron (with i=0-3) and $R_s, G_s$ and $B_s$ are the measured R, G and B values of the sample color 's' to be tested (i.e. $W_m$ and $K_m$). This computational method is one example, and many other interpolation techniques may be used.

The estimated actual colors for the black and white areas ($K_E$ and $W_E$) are converted from the RGB color space ($R_{EK}, G_{EK}, B_{EK}$ and $R_{EW}, G_{EW}, B_{EW}$) into LAB color space ($L^*_K, a^*_K, b^*_K$ and $L^*_W, a^*_W, b^*_W$). The color difference between the estimated actual colors for the black and white areas ($K_E$ and $W_E$) is determined using Equation 3 (below).

$$\Delta E = ((L^*_K - L^*_W)^2 + (a^*_K - a^*_W)^2 + (b^*_K - b^*_W)^2)^{1/2} \quad \text{Equation 3}$$

The translucence T of the sample media is linearly correlated to the color difference over a wide translucence range and can be determined as $$T(C1 * \Delta E) + C2 \quad \text{Equation 4}$$

Where C1 and C2 are linear fits based on previously measured and modeled translucence data and is a function of the chart design and other parameters.

Figure 4:
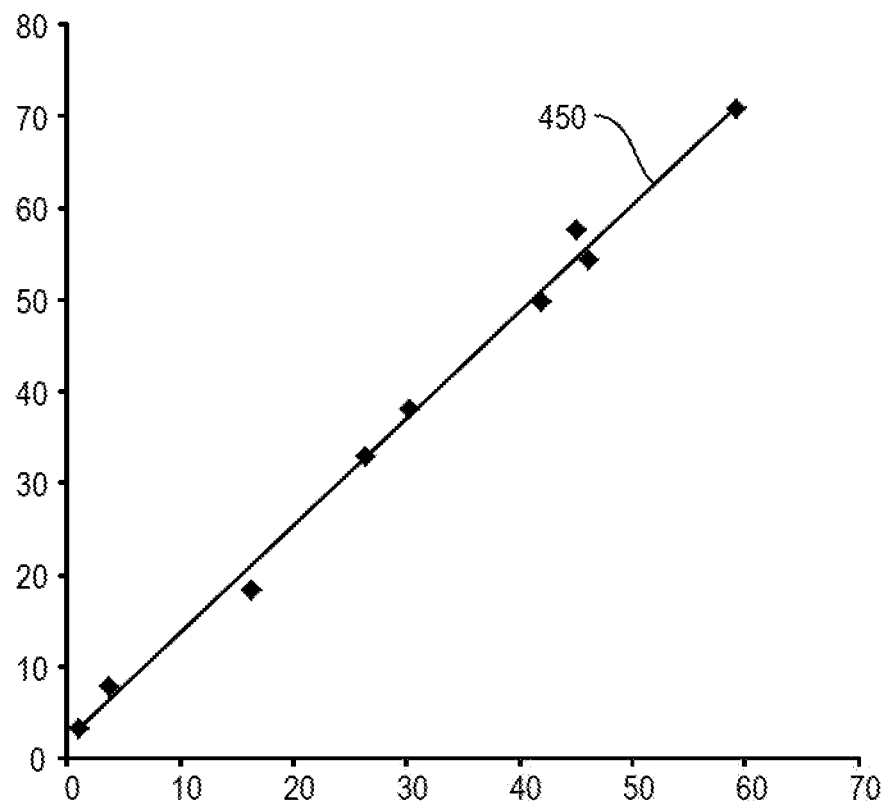
FIG. 4 is an example plot of the known translucence of media vs. the measured translucence of the media using a given color chart.

The coefficients C1 and C2 can be determined by correlating the known translucence of a number of sample media types to the measured color difference of the sample media types using a given color chart. FIG. 4 is an example plot of the known translucence of media vs. the measured translucence of the media using a given color chart. In FIG. 4 the vertical axis is the known translucence of media. The horizontal axis is the measured translucence (i.e. the color difference between the black and white sample areas) of the media with a given color chart. Nine different media types are plotted on FIG. 4. Line 450 is the best fit to the nine samples. The coefficients C1 and C2 can be determined by the line 450 (i.e. C1=1.167 and C2=2.067). Once the translucence T of the sample media has been calculated the translucence can be used to determine if the media is appropriate for a give print job.

In the description above a single image of the sample media and target is used to calculate the translucence T of the sample media. In other examples multiple images of the sample media and target may be used to calculate multiple values for the translucence T of the sample media. These multiple values of the translucence T of the sample media may be combined to reduce any noise in the system. In some examples the multiple images may all be taken using the same illumination. In other examples, some images of the sample media and target may be captured using a first type of illumination, for example ambient light. And other images of the sample media and target may be captured using a second type of illumination, for example ambient light plus as flash.

Figure 5:
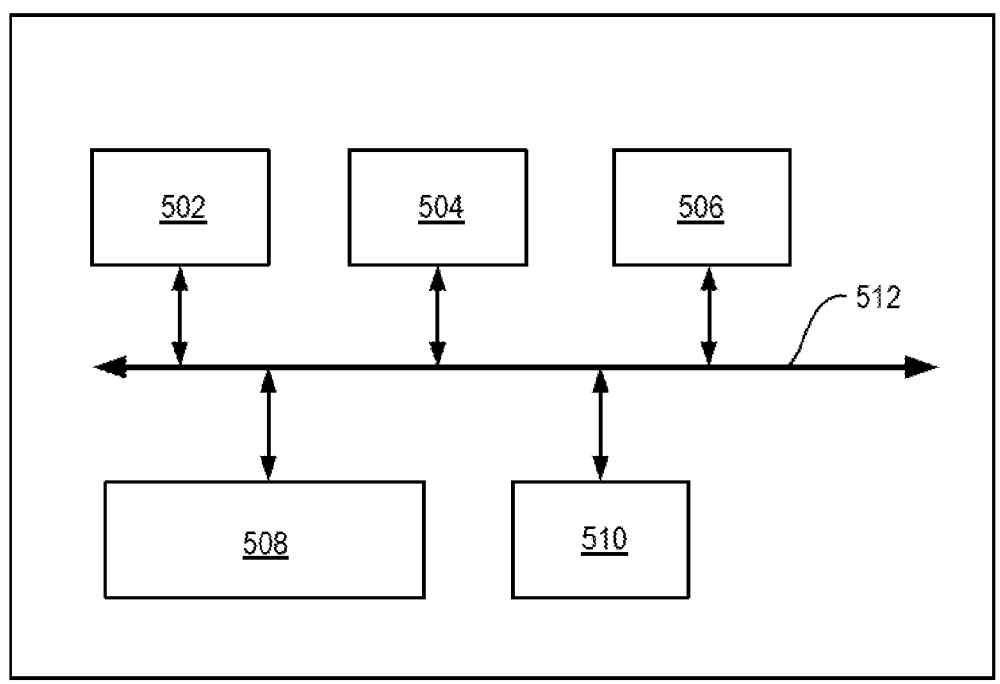
FIG. 5 is an example block diagram of a computer.

In some examples the translucence of the sample media can be calculated by the hardware or firmware inside the camera used to capture the image of the sample media and target. In other examples the image of the sample media and target may be transferred into a computer and software in the computer may be used to calculate the translucence of the sample media. The computer may be a local computer or may be a service provided by servers/computers on the cloud/Internet. FIG. 5 is an example block diagram of a computer.

Computer comprises a processor 502, memory 504, input/output (I/O) module 506, display 508 and controller 510 all coupled together on bus 512. In some examples computer may also have a user interface module, an input device, and the like, but these items are not shown for clarity. Processor 502 may comprise a central processing unit (CPU), a microprocessor, an application specific integrated circuit (ASIC), or a combination of these devices. Memory 504 may comprise volatile memory, non-volatile memory, and a storage device. Memory 504 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 506 is used to couple computer to other devices, for example the Internet or a camera. Computer has code, typically called software, stored in the memory 504. The software is stored as computer readable instructions in the non-transitory computer readable medium (i.e. the memory 504). Processor 502 generally retrieves and executes the instructions stored in the non-transitory computer-readable medium to operate the computer and to execute functions. In one example, processor executes code that calculates translucence.

Figure 6:
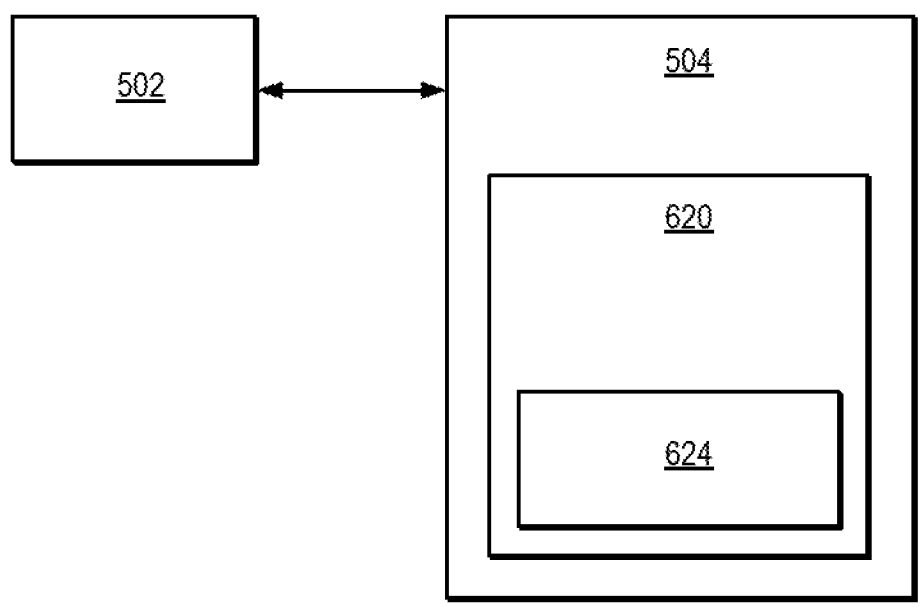
FIG. 6 is an example block diagram of the processor 502 coupled to memory 504.

FIG. 6 is an example block diagram of the processor 502 coupled to memory 504. Memory 504 contains software 620. Software 620 contains a translucence calculation module 624. The processor 602 executes the code in translucence calculation module 624 to calculate the translucence of a sample media using an image of the sample media and target.

What is claimed is:

1. A system for measuring the translucence of media, comprising:
    a processor coupled to memory, the memory comprising a translucence calculation module, the translucence calculation module, when executed by the processor, determines translucence of media by:
    analyzing a first image of a target loaded with the media wherein the target has a first region and a second region, the first region of the target having a color chart, the color chart having a plurality of color patches, the second region of the target having a test pattern wherein the media covers the test pattern when loaded onto the target;
    determining the closest M color patches to a first area in the image of the second region;
    determining the closest N color patches to a second area in the image of the second region;
    calculating an estimated actual color for the first and second areas in the image of the second region using known color values of the M and N color patches; and
    determining the translucence of the media using the estimated actual color of the first and second areas of the image of the second region.

2. The system of claim 1, wherein the first area in the image of the second region is located over a black patch in the test pattern and the second area in the image of the second region is located over a white patch in the test pattern.

3. The system of claim 1, wherein the translucence T of the media is determined by the color difference ΔE between the estimated actual color of the first and second areas of the image of the second region using the formula T=(C1*ΔE)+C2 wherein C1 and C2 are coefficients based on previously measured translucence data using the color chart.

4. The system of claim 1, wherein the estimated actual color of the first and second areas of the image of the second region are determined using interpolation between the measured color values of color patches forming a bounding tetrahedron for the first and second areas, the known values of the color patches forming the bounding tetrahedron, and the measured values of the first and second areas of the image of the second region.

5. The system of claim 1, further comprising:
    analyzing at least a second image of the target loaded with the media;
    determining the closest M color patches to a first area in the image of the second region in the at least second image of the target and media;
    determining the closest N color patches to a second area in the image of the second region in the at least second image of the target and media;
    calculating an estimated actual color for the first and second areas in the image of the second region in the at least second image of the target and media using known color values of the M and N color patches;
    determining the translucency of the media using the estimated actual color of the first and second areas of the image of the second region in the at least second image of the target and media; and
    combining the translucency of the media from the single image of the target with the translucency of the media from the at least second image of the target and media to create a final value for the translucency of the media.

6. The system of claim 5, wherein the single image of the target is captured using a first illumination and the at least second image of the target and media is captured with a second, different illumination.

7. A test target for measuring translucence, comprising:
    a first region having a color chart, the color chart having a plurality of color patches;
    a second region having a test pattern wherein media covers the test pattern when loaded onto the target and where the media does not cover the color chart when loaded onto the target; and
    a front fold and a back fold, the front fold and back fold coupled together by a crease in a piece of media, the front fold including an opening.

8. The test target for measuring translucence of claim 7, wherein the test pattern is half black and half white.

9. The test target for measuring translucence of claim 7, further comprising:
    the target having an open position and a closed position wherein the front fold is positioned against the back fold when the target is in the closed position;
    the front fold having the color chart; and
    the back fold having the test pattern located such that the test pattern is visible through the opening in the front fold when the target is in the closed position.

10. A non-transitory computer readable medium containing computer instructions that, when executed by a processor, determine the translucence of media, comprising:
    analyzing a first image of a target loaded with media wherein the target has a first region and a second region, the first region of the target having a color chart, the color chart having a plurality of color patches, the second region of the target having a test pattern wherein the media covers the test pattern when loaded onto the target;
    estimating an actual color for a first and a second area in the image of the second region based on the imaged color values of the color chart of the first region; and
    determining the translucency of the media using the estimated actual color of the first and second areas of the image of the second region.

11. The non-transitory computer readable medium of claim 10, wherein the first area in the image of the second region is located over a black patch in the test pattern and the second area in the image of the second region is located over a white patch in the test pattern.

12. The non-transitory computer readable medium of claim 10, wherein the translucence T of the media is determined by the color difference ΔE between the estimated actual color of the first and second areas of the image of the second region.

13. The non-transitory computer readable medium of claim 10, further comprising:

analyzing at least a second image of the target loaded with the media wherein the target has a first region and a second region, the first region of the target having a color chart, the color chart having a plurality of color patches, the second region of the target having a test pattern wherein the media covers the test pattern when loaded onto the target;

determining the closest M color patches to a first area in the image of the second region of the at least second image;

determining the closest N color patches to a second area in the image of the second region in the at least second image;

calculating an estimated actual color for the first and second areas in the image of the second region using known color values of the M and N color patches;

determining the translucency of the media using the estimated actual color of the first and second areas of the image of the second region in the at least second image; and combining the translucency of the media from the first image of the target with the translucency of the media from the at least second image of the target to create a final value for the translucency of the media.

14. The non-transitory computer readable medium of claim 13, wherein the first image of the target is captured using a first illumination and the at least second image of the target and media is captured with a second, different illumination.

* * * * *